United States Patent
Yang (10) Patent No.: US 8,408,095 B2
(45) Date of Patent: Apr. 2, 2013

(54) BIDIRECTIONAL DIFFERENT SPEED RATIO DRIVING DEVICE WITH BIDIRECTIONAL MANPOWER INPUT

(76) Inventor: Tai-Her Yang, Dzan-Hwa (TW)

( * ) Notice: Subject to any disclaimer, the term of this patent is extended or adjusted under 35 U.S.C. 154(b) by 924 days.

(21) Appl. No.: 12/382,510

(22) Filed: Mar. 18, 2009

(65) Prior Publication Data

US 2010/0154586 A1    Jun. 24, 2010

Related U.S. Application Data

(63) Continuation-in-part of application No. 12/314,947, filed on Dec. 19, 2008, now abandoned.

(51) Int. Cl.
*F16H 3/00* (2006.01)

(52) U.S. Cl. .......... 74/810.1; 74/810.2; 280/200

(58) Field of Classification Search .......... 74/810.1, 74/810.2; 180/219; 280/200
See application file for complete search history.

(56) References Cited

U.S. PATENT DOCUMENTS

| | | | | |
|---|---|---|---|---|
| 5,970,822 A | * | 10/1999 | Jung et al. | 74/810.1 |
| 7,156,780 B1 | * | 1/2007 | Fuchs et al. | 482/92 |
| 2010/0154585 A1 | * | 6/2010 | Yang | 74/810.1 |

* cited by examiner

*Primary Examiner* — Ha D. Ho
(74) *Attorney, Agent, or Firm* — Bacon & Thomas, PLLC (57) ABSTRACT

A foot-pedaling device with bidirectional pedaling for constantly driving a loading wheel train in the same direction, wherein the pedaling direction is selected by the riding pedaler according to the operating status of his/her muscles and joints, or through the different driving directional input, to provide different-speed-change-ratio output.

14 Claims, 6 Drawing Sheets

Fig. 10  ELECTRIC POWER OUT PUT

Fig. 11  ELECTRIC POWER OUT PUT

Fig. 12  ELECTRIC POWER OUT PUT

|  | positive pedaling | reverse pedaling |
|---|---|---|
| rectus abdominus | ● | ●●● |
| quadriceps femoris muscle...etc | ●●●● | ●●● |
| biceps femoris...etc | ●● | ●●● |
| tibialis anterior...etc | ●● | ● |
| soleus, gastrocnemius...etc | ● | ●● |

Fig. 17

|  | positive pedaling | reverse pedaling |
|---|---|---|
| ischial tuberosity | ● ● | ● ● ● |
| ischio-pubic ramus | ● ● | ● |

Fig. 18

BIDIRECTIONAL DIFFERENT SPEED RATIO DRIVING DEVICE WITH BIDIRECTIONAL MANPOWER INPUT

CROSS REFERENCE TO RELATED APPLICATION

This is a continuation-in part of application Ser. No. 12/314,947, filed on Dec. 19, 2008 now abandoned.

BACKGROUND OF THE INVENTION (a) Field of the Invention

The present invention discloses that the input end of the manpower input device is driven by both or one of the human hand or foot in the bidirectional positive or reverse rotating direction, and it is through the output end of the manpower input device to operate the bidirectional different speed ratio output via the bidirectional different speed ratio speed change device for driving the loading wheel train, wherein the present invention is applied in foot pedal or hand swing vehicles, or both or one of the bidirectional rotating foot pedal and hand swing manual driven vehicles, or applied in the foot pedal or hand swing sports devices, or both or one of the bidirectional rotating foot pedal or hand swing manual driven sports devices, or applied in both or one of the foot pedal or hand swing driven devices such as fluid pump, or fan or power generator.

(b) Description of the Prior Art

We all know that constant directional foot pedaling requires the periodic and constant use of relevant muscles and joints, i.e. partial muscles and joints of the pedaler's limbs are constantly under force application and stressing conditions, while the other part of muscles and joints are constantly under no force application or non-stressing conditions, therefore, as a whole, the bearing of the human body is uneven to easily get tired and cause sports injuries.

SUMMARY OF THE INVENTION

The present invention disclosed that the output end of the bidirectional manpower input device being particularly used to provide bidirectional rotating input is transmitted to the input end of the bidirectional different speed ratio speed change device, and is through the output end of the bidirectional different speed ratio speed change device to provide the bidirectional different speed ratio output for driving the loading wheel train, wherein the user can freely decide the driving input direction to allow the bidirectional different speed ratio speed change device to provide the constant rotating directional output at different speed change ratio while in different driving input direction.

The present invention is especially applying as an upright bidirectional pedaling bicycle or as an upright bidirectional pedaling device for lower limbs bidirectional pedaling in order to widen the use of muscles and change the muscle strength and density, and obtain the following advantages:
(1) reducing injuries caused by overuse of partial muscles and joints;
(2) working the muscles and joints seldom being used or trained;

Above advantages can be applied at various bidirectional manpower driving using different muscle groups; especially when apply bidirectional pedaling driving at upright bicycles or upright pedaling exercise devices, the difference of the muscle groups using for bidirectional pedaling is bigger, that makes the said advantages and their effects more obvious. (Please refer to the analysis and description in FIGS. 13-25.)

DESCRIPTION OF MAIN COMPONENT SYMBOLS

101: Bidirectional manpower input device
102: Bidirectional different speed ratio speed change device 103: Loading wheel train
104, 200: Transmission device
105: Externally added operatively controllable damping device
106: Damped loading wheel train
107: Operatively controllable damped loading wheel train
108: Rotating type mechanical functioning device
109: Power generator set
110: Operative control device relative to power generator
111: Circuit switch and protecting device
112: Externally added damping device

DETAILED DESCRIPTION OF THE PREFERRED EMBODIMENTS

The present invention discloses that the input end of the bidirectional manpower input device is driven by both or one of the human hand or foot in the bidirectional positive or reverse rotating direction for transmission from the output end of the bidirectional manpower input device to the input end of the bidirectional speed change transmission device, and it is through the output end of the bidirectional different speed ratio speed change device to operate the bidirectional different speed ratio output for driving the loading wheel train, wherein the present invention is applied in foot pedal or hand swing vehicles, or both or one of the bidirectional rotating foot pedal and hand swing manual driven vehicles, or applied in the foot pedal or hand swing sports devices, or both or one of the bidirectional rotating foot pedal or hand swing manual driven sports devices, or applied in both or one of the foot pedal or hand swing driven devices such as fluid pump, fan or power generator. The present invention is especially applying as an upright bidirectional pedaling bicycle or as an upright bidirectional pedaling device for lower limbs bidirectional pedaling in order to widen the use of muscles and change the muscle strength and density, and obtain the following advantages:
(1) reducing injuries caused by overuse of partial muscles and joints;
(2) working the muscles and joints seldom being used or trained;

Above advantages can be applied at various bidirectional manpower driving using different muscle groups; especially when apply bidirectional pedaling driving at upright bicycles or upright pedaling exercise devices, the difference of the muscle groups using for bidirectional pedaling is bigger, that makes the said advantages and their effects more obvious.

The present invention discloses that the output end of a particular bidirectional manpower input device capable of receiving bidirectional rotating input is transmitted to the input end of the bidirectional different speed ratio speed change device, and it is through the output end of the bidirectional different speed ratio speed change device to operate the bidirectional different speed ratio output for driving the loading wheel train, wherein the user can freely decide the driving input direction to allow the bidirectional different speed ratio speed change device to provide the different rotating directional output at different speed change ratio while in different driving input direction.

Figure 1:
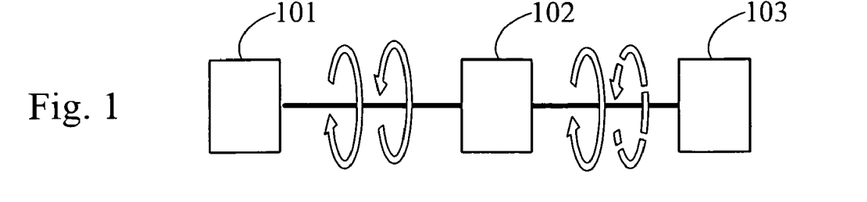
FIG. 1 is a block schematic view of basic structure of the bidirectional different speed ratio driving device with bidirectional manpower input of the present invention.

FIG. 1 is a block schematic view of basic structure of the bidirectional different speed ratio driving device with bidirectional manpower input of the present invention.

Figure 2:
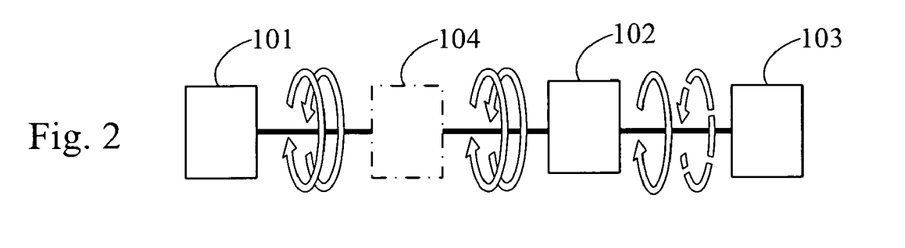
FIG. 2 is a block schematic view showing the driving device application example of FIG. 1, wherein a transmission device(104) is additionally installed between the bidirectional manpower input device(101) and the bidirectional different speed ratio speed change device(102).

FIG. 2 is a block schematic view showing the driving device application example of FIG. 1, wherein a transmission device(104) is additionally installed between the bidirectional manpower input device(101) and the bidirectional different speed ratio speed change device(102).

Figure 3:
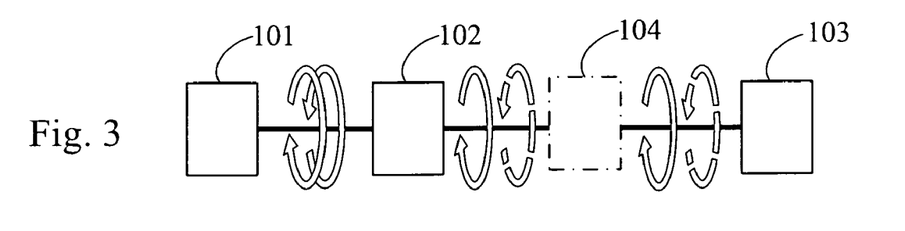
FIG. 3 is a block schematic view showing the driving device application example of FIG. 1, wherein a transmission device(104) is additionally installed between the bidirectional different speed ratio speed change device(102) and the driven loading wheel train(103).

FIG. 3 is a block schematic view showing the driving device application example of FIG. 1, wherein a transmission device(104) is additionally installed between the bidirectional different speed ratio speed change device(102) and the driven loading wheel train(103).

Figure 4:
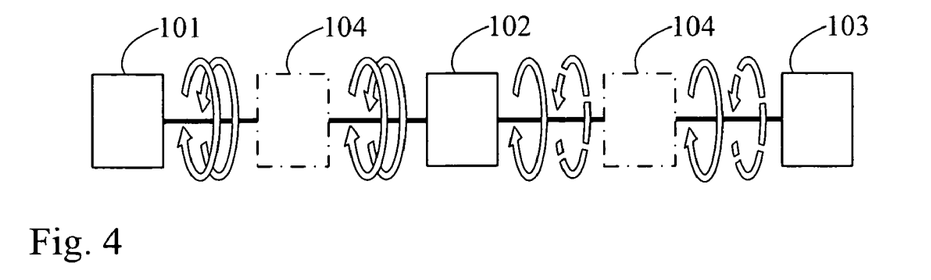
FIG. 4 is a block schematic view showing the driving device application example of FIG. 1, wherein a transmission device(104) is respectively additionally installed between the bidirectional manpower input device(101) and the bidirectional different speed ratio speed change device(102) as well as between the bidirectional different speed ratio speed change device(102) and the driven loading wheel train(103).

FIG. 4 is a block schematic view showing the driving device application example of FIG. 1, wherein a transmission device(104) is respectively additionally installed between the bidirectional manpower input device(101) and the bidirectional different speed ratio speed change device(102) as well as between the bidirectional different speed ratio speed change device(102) and the driven loading wheel train(103).

The bidirectional different speed ratio driving device with bidirectional manpower input is through the manpower of both or one of the hand or foot to drive the bidirectional manpower input device(101) for rotating clockwise or counter-clockwise, wherein the rotating power output from the output end of bidirectional manpower input device(101) is transmitted to the input end of the bidirectional different speed ratio speed change device(102) directly or via a transmission device(104) for providing the bidirectional different speed ratio rotating power to drive the loading wheel train (103) as shown in FIG. 1~4, wherein:

The bidirectional manpower input device(101): It is constituted by the input mechanism capable of receiving the bidirectional positive or reverse rotating input or reciprocation driven by both or one of the hand or foot of human limbs, wherein its constitution comprises the pedals, crankshafts and the bidirectional rotating transmission wheel train, or comprises the handles, shafts, and the bidirectional rotating transmission wheel train, or comprises the conventional manpower driven bidirectional rotating mechanism;

The input powers of the first driving rotating direction and second driving rotating direction are from both or one of the hand or foot of the manpower for driving the input end of the bidirectional manpower input device(101);

The first driving rotating direction and second driving rotating direction are contrary to each other;

The bidirectional different speed ratio speed change device (102): The bidirectional different speed ratio speed change device(102) receives the different directional rotating power from the bidirectional manpower input device(101) directly or via a transmission device(104) while provides the bidirectional different speed ratio power output; the bidirectional different speed ratio speed change device(102) is constituted by the internal transmission components of the following: 1) gear train; or 2) friction wheel train; or 3) chain and sprocket train; or 4) belt and pulley train; or 5) transmission crankshaft and wheel train; or 6) fluid transmission device; or 7) electromagnetic transmission device; or it is constituted by one or more than one of above said transmission components; when the bidirectional different speed ratio speed change device(102) is driven by the different rotating directional inputs of the first driving rotating direction and second driving rotating direction, the relative directional relationship at the bidirectional output end corresponding to the reversely different input direction at the input end can be the same or different, and the speed ratios between the output directions corresponding to different input directions are different;

The loading wheel train(103): It is a wheel-type load driven by the output end of the bidirectional different speed ratio speed change device(102) directly or via the wheel load of a transmission device(104);

The bidirectional different speed ratio driving device with bidirectional manpower input is applied in the bidirectional carriers driven by both or one of the human hand or foot of the manpower, wherein the bidirectional rotating power output at the output end of the bidirectional manpower input device (101) which is driven in positive or reverse rotating direction by both or one of the human hand or foot of manpower allows at least one bidirectional different speed ratio speed change device(102) to provide bidirectional different speed ratio rotating output directly or via a transmission device(104), while the output rotating power is used to drive the loading wheel train(103) directly or via a transmission device(104); the bidirectional manpower input device(101) is driven by both or one of the human hand or foot in positive or reverse rotation to provide relative rotating directional output at a selected speed ratio;

The transmission device(104): The transmission device (104) is constituted by one or more than one transmission devices of the following: 1) various gear-type, belt-type, friction-type fixed speed ratio or variable-speed ratio rotating type transmission functioning structure, or 2) a stepped or stepless variable speed device being operated manually, or by the mechanical force, or fluid force, or centrifugal force, or rotating torque or counter-rotating torque, or 3) the transmission device of the capability to operatively control the switching relationship of the relative rotating directions at the input end and output end, or 4) the clutch device or the single way clutch being operated manually, or by the mechanical force, or electromagnetic force, or fluid force, or centrifugal force, or rotating torque, or counter-rotating torque for connecting transmission or interrupting transmission clutch functioning device.

Figure 5:
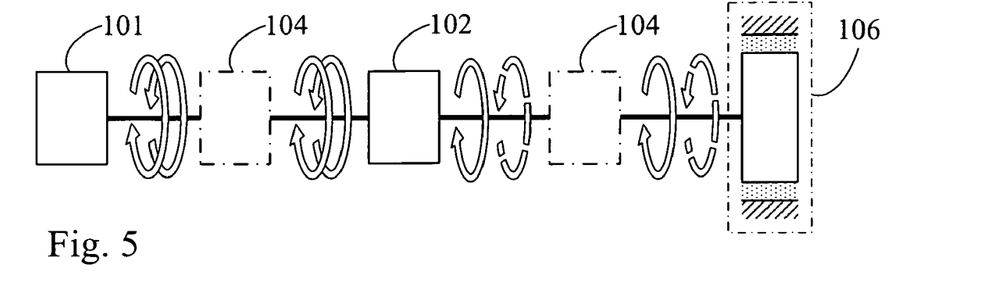
FIG. 5 is a block schematic view of the application example showing that the present invention is applied in the manpower driven sports device having the fixed damped loading wheel train.

The bidirectional different speed ratio driving device with bidirectional manpower input is further applied in the manpower driven sports device such as the exercise bicycles as shown in FIG. 5 which is a block schematic view of the application example showing that the present invention is applied in the manpower driven sports device having the fixed damped loading wheel train, wherein it comprises a bidirectional manpower input device(101) being driven by both or one of the hand and foot of manpower in positive or reverse rotation, and the output rotating power from the bidirectional manpower input device(101) is directly transmitted to the input end of at least one bidirectional different speed ratio speed change device(102) directly or via a transmission device(104), and it is further through the output end of the bidirectional different speed ratio speed change device(102) to provide bidirectional different speed ratio rotating power output for driving the damped loading wheel train(106) directly or via a transmission device(104), wherein the transmission device (104) is constituted by one or more than one transmission devices of the following: 1) various gear-type, belt-type, friction-type fixed speed ratio or variable-speed ratio rotating type transmission functioning structure, or 2) a stepped or stepless variable speed device being operated manually, or by the mechanical force, or fluid force, or centrifugal force, or rotating torque or counter-rotating torque, or 3) the transmission device of the capability to operatively control the switching relationship of the relative rotating directions at the input end and output end, or 4) the clutch device or the single way clutch being operated manually, or by the mechanical force, or electromagnetic force, or fluid force, or centrifugal force, or rotating torque, or counter-rotating torque for connecting transmission or interrupting transmission clutch functioning device;

wherein the damped loading wheel train(106) has its own fixed damping to produce damping in the sports device function operations;

The self-installed damping of aforesaid damped loading wheel train(106) includes the damping structures such as the friction damping type, or fluid damping type, or counter-rotating torque damping of power generation type, or electric counter-rotating torque type, or electromagnetic eddy current generation damping type structures.

Figure 6:
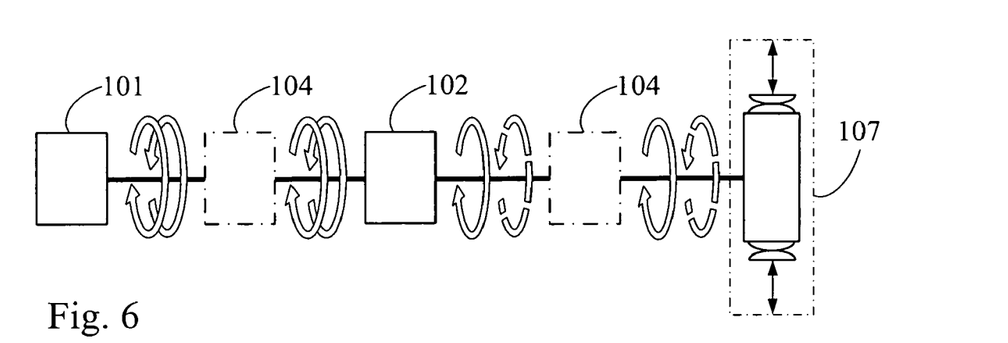
FIG. 6 is a block schematic view of the application example showing that the present invention is applied in the manpower bidirectional driven sports device having the operatively controllable damped loading wheel train.

The bidirectional different speed ratio driving device with bidirectional manpower input is further applied in the manpower driven sports device installed with operatively controllable damping device such as the exercise bicycles as shown in FIG. 6 which is a block schematic view of the application example showing that the present invention is applied in the manpower driven sports device having the operatively controllable damped loading wheel train, wherein it comprises a bidirectional manpower input device(101) being driven by both or one of the hand and foot of manpower in positive or reverse rotation, and the output rotating power from the bidirectional manpower input device(101) is transmitted to the input end of at least one bidirectional different speed ratio speed change device(102) directly or via a transmission device(104), and it is further through the output end of the bidirectional different speed ratio speed change device(102) to provide bidirectional different speed ratio rotating power output for driving the operatively controllable damped loading wheel train (107) directly or via a transmission device (104), wherein the transmission device (104) is constituted by one or more than one transmission devices of the following: 1) various gear-type, belt-type, friction-type fixed speed ratio or variable-speed ratio rotating type transmission functioning structure, or 2) a stepped or stepless variable speed device being operated manually, or by the mechanical force, or fluid force, or centrifugal force, or rotating torque or counter-rotating torque, or 3) the transmission device of the capability to operatively control the switching relationship of the relative rotating directions at the input end and output end, or 4) the clutch device or the single way clutch being operated manually, or by the mechanical force, or electromagnetic force, or fluid force, or centrifugal force, or rotating torque, or counter-rotating torque for connecting transmission or interrupting transmission clutch functioning device;

wherein the operatively controllable damped loading wheel train (107) has its own operatively controllable damping to produce operatively controllable damping in sports device function operations;

The operatively controllable damping produced by aforesaid operatively controllable damped loading wheel train (107) includes the operatively controllable damping structures such as the friction damping type, or fluid damping type, or counter-rotating torque damping of power generation type, or electric counter-rotating torque type, or electromagnetic eddy current generation damping type structures so as to operatively control the damping value produced by the operatively controllable damped loading wheel train (107);

The operative control method of aforesaid operatively controllable damped loading wheel train (107) is based on the type of damping structure selected for operatively controlling the operatively controllable damped loading wheel train (107) so as to produce the operative controllable damping function via the fluid power, or mechanical power, or electric power operative control method and device.

Figure 7:
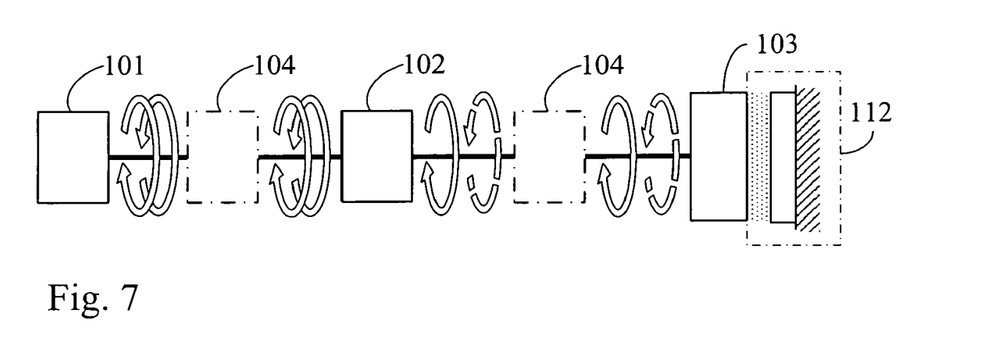
FIG. 7 is a block schematic view of the application example showing that the present invention is applied in the manpower driven carriers by additionally installing the fixed damping device to produce damping thereby constituting the sports device function.

The manpower driven carrier of the bidirectional different speed ratio driving device with bidirectional manpower input is further installed with the externally added damping device (112) to produce damping effect together with the loading wheel train(103) thereby been transformed to have the sports device function for use as shown in FIG. 7 which is a block schematic view of the application example showing that the present invention is applied in the manpower driven carriers by additionally installing the fixed damping device to produce damping thereby constituting the sports device function, wherein it comprises a bidirectional manpower input device (101) being driven by both or one of the hand and foot of manpower in positive or reverse rotation and at least one bidirectional different speed ratio speed change device(102), and the output rotating power from the bidirectional manpower input device(101) is transmitted to the input end of at least one bidirectional different speed ratio speed change device(102) directly or via a transmission device(104), and it is further through the output end of the bidirectional different speed ratio speed change device(102) to provide bidirectional different speed ratio rotating power output for driving the loading wheel train(103) directly or via a transmission device (104), wherein the transmission device (104) is constituted by one or more than one transmission devices of the following: 1) various gear-type, belt-type, friction-type fixed speed ratio or variable-speed ratio rotating type transmission functioning structure, or 2) a stepped or stepless variable speed device being operated manually, or by the mechanical force, or fluid force, or centrifugal force, or rotating torque or counter-rotating torque, or 3) the transmission device of the capability to operatively control the switching relationship of the relative rotating directions at the input end and output end, or 4) the clutch device or the single way clutch being operated manually, or by the mechanical force, or electromagnetic force, or fluid force, or centrifugal force, or rotating torque, or counter-rotating torque for connecting transmission or interrupting transmission clutch functioning device;

wherein the loading wheel train(103) is installed with at least one externally added damping device(112) to produce damping in the sports device function operations;

The damping structure of aforesaid externally added damping device(112) being additionally installed to the loading wheel train(103) for producing the damping effect includes the operatively controllable damping structures such as the friction damping type, or fluid damping type, or counter-rotating torque damping of power generation type, or electric counter-rotating torque type, or electromagnetic eddy current generation damping type structures.

Figure 8:
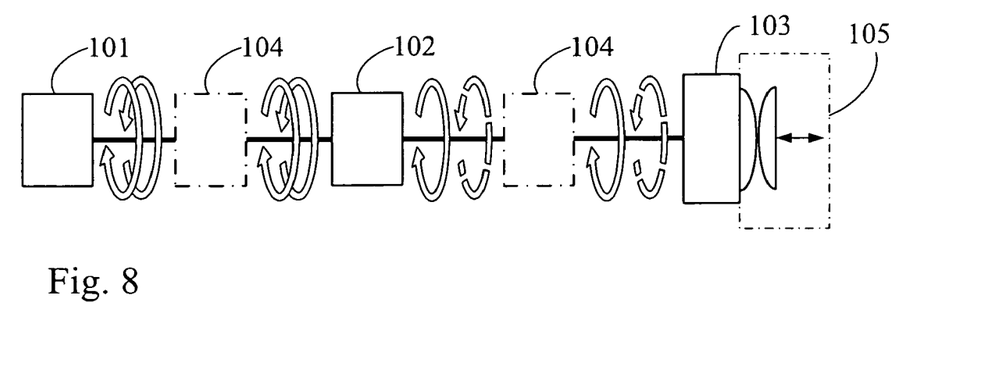
FIG. 8 is a block schematic view of the application example showing that the present invention is applied in the manpower driven carriers by installing the externally added operatively controllable damping device(105) to constitute the sports device function.

The manpower driven carrier of the bidirectional different speed ratio driving device with bidirectional manpower input is further installed with externally added operatively controllable damping device(105) for being transformed to use as sports device function as shown in FIG. 8 which is a block schematic view of the application example showing that the present invention is applied in the manpower driven carriers by installing the externally added operatively controllable damping device(105) to constitute the sports device function, wherein it comprises a bidirectional manpower input device (101) being driven by both or one of the hand and foot of manpower in positive or reverse rotation and at least one bidirectional different speed ratio speed change device(102), and the output rotating power from the bidirectional manpower input device(101) is transmitted to the input end of at least one bidirectional different speed ratio speed change device(102) directly or via a transmission device(104), and it is further through the output end of the bidirectional different speed ratio speed change device(102) to provide bidirectional different speed ratio rotating power output for driving the loading wheel train(103) directly or via a transmission device (104), wherein the transmission device (104) is constituted by one or more than one transmission devices of the following: 1) various gear-type, belt-type, friction-type fixed speed ratio or variable-speed ratio rotating type transmission functioning structure, or 2) a stepped or stepless variable speed device being operated manually, or by the mechanical force, or fluid force, or centrifugal force, or rotating torque or counter-rotating torque, or 3) the transmission device of the capability to operatively control the switching relationship of the relative rotating directions at the input end and output end, or 4) the clutch device or the single way clutch being operated manually, or by the mechanical force, or electromagnetic force, or fluid force, or centrifugal force, or rotating torque, or counter-rotating torque for connecting transmission or interrupting transmission clutch functioning device;

wherein the loading wheel train(103) is installed with at least one externally added operatively controllable damping device(105) for producing and operatively control the damping in the sports device function operations;

The damping structure of aforesaid externally added operatively controllable damping device(105) includes the operatively controllable damping structures such as the friction damping type, or fluid damping type, or counter-rotating torque damping of power generation type, or electric counter-rotating torque type, or electromagnetic eddy current generation damping type structures, wherein the externally added operatively controllable damping device(105) is based on the type of damping structure selected for operatively controlling the damping value in the sports device function operations via the fluid power, or mechanical power, or electric power operative control method and device.

Figure 9:
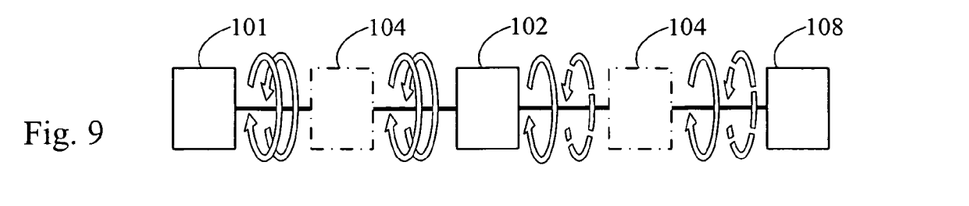
FIG. 9 is a block schematic view of the application example showing that rotating type mechanical functioning device with bidirectional different speed change ratio is driven by the present invention.

For the bidirectional different speed ratio driving device with bidirectional manpower input, the input end of the bidirectional manpower input device(101) is driven by the manpower to receive positive or reverse rotating power input, while the output rotating power from the output end of the bidirectional manpower input device(101) is transmitted to the input end of the bidirectional different speed ratio speed change device(102) and it is further through the output end of the bidirectional different speed ratio speed change device (102) to provide constant rotating directional mechanical power output for driving the mechanical functioning device in constant rotating direction as shown in FIG. 9 which is a block schematic view of the application example showing that the bidirectional different speed change ratio rotating type mechanical functioning device is driven by the present invention, wherein it comprises a bidirectional manpower input device(101) being driven by both or one of the hand and foot of manpower in positive or reverse rotation, and the output rotating power from the output end of the bidirectional manpower input device(101) is transmitted to the input end of the bidirectional different speed ratio speed change device (102) directly or via a transmission device(104), and it is further through the output end of the bidirectional different speed ratio speed change device(102) to provide bidirectional different speed ratio rotating power output for driving the rotating type mechanical functioning device(108) directly or via a transmission device(104), wherein the rotating type mechanical functioning device(108) includes the fluid pump, or the fan, or the inertia energy storing flywheel, or other manpower driven rotating type mechanical functioning device, and the transmission device (104) is constituted by one or more than one transmission devices of the following: 1) various gear-type, belt-type, friction-type fixed speed ratio or variable-speed ratio rotating type transmission functioning structure, or 2) a stepped or stepless variable speed device being operated manually, or by the mechanical force, or fluid force, or centrifugal force, or rotating torque or counter-rotating torque, or 3) the transmission device of the capability to operatively control the switching relationship of the relative rotating directions at the input end and output end, or 4) the clutch device or the single way clutch being operated manually, or by the mechanical force, or electromagnetic force, or fluid force, or centrifugal force, or rotating torque, or counter-rotating torque for connecting transmission or interrupting transmission clutch functioning device.

Figure 10:
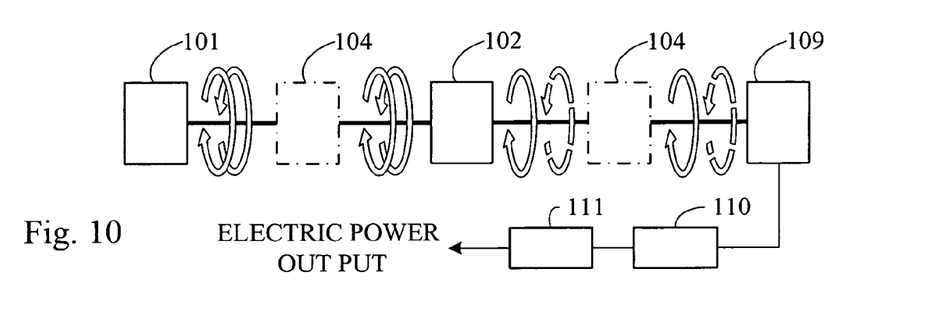
FIG. 10 is a block schematic view of the present invention showing the application example using for driving the power generator.

For the bidirectional different speed ratio driving device with bidirectional manpower input, the input end of the bidirectional manpower input device(101) is driven by the manpower to receive positive or reverse rotating power input, while the output rotating power from the output end of the bidirectional manpower input device(101) is transmitted to the input end of the bidirectional different speed ratio speed change device(102), and it is further through the output end of the bidirectional different speed ratio speed change device (102) to provide bidirectional different speed ratio rotating directional output for driving the power generator(109) as shown in FIG. 10 which is a block schematic view of the present invention showing the application example for driving the power generator, wherein it comprises a bidirectional manpower input device(101) being driven by both or one of the hand and foot of manpower in positive or reverse rotation, and the output rotating power from the output end of the bidirectional manpower input device(101) is transmitted to the input end of the bidirectional different speed ratio speed change device(102) directly or via a transmission device (104), and it is further through the output end of the bidirectional different speed ratio speed change device(102) to provide bidirectional different speed ratio rotating power output for driving the rotating type power generator(109) directly or via a transmission device(104), wherein the transmission device (104) is constituted by one or more than one transmission devices of the following: 1) various gear-type, belt-type, friction-type fixed speed ratio or variable-speed ratio rotating type transmission functioning structure, or 2) a stepped or stepless variable speed device being operated manually, or by the mechanical force, or fluid force, or centrifugal force, or rotating torque or counter-rotating torque, or 3) the transmission device of the capability to operatively control the switching relationship of the relative rotating directions at the input end and output end, or 4) the clutch device or the single way clutch being operated manually, or by the mechanical force, or electromagnetic force, or fluid force, or centrifugal force, or rotating torque, or counter-rotating torque for connecting transmission or interrupting transmission clutch functioning device;

wherein the power generator(109) is further optionally installed with the power generator related operative control device(110) and the circuit switch or protecting device(111).

Figure 11:
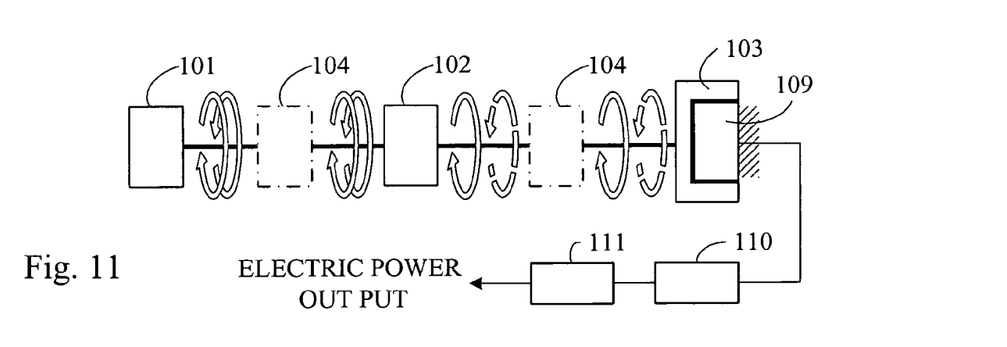
FIG. 11 is a block schematic view of the application example showing that the loading wheel train(103) and the power generator set(109) driven by the present invention are combined in an integral structure.

For the bidirectional different speed ratio driving device with bidirectional manpower input, the loading wheel train (103) and the power generator(109) are combined in an integral structure in the application of driving power generator (109) as shown in FIG. 11 which is a block schematic view of the application example showing that the loading wheel train (103) and the power generator(109) driven by the present invention are combined in an integral structure, wherein it comprises a bidirectional manpower input device(101) being driven by both or one of the hand and foot of manpower in positive or reverse rotation, and the output rotating power from the bidirectional manpower input device(101) is transmitted to the input end of the bidirectional different speed ratio speed change device(102) directly or via a transmission device(104), and it is further through the output end of the bidirectional different speed ratio speed change device(102) to provide bidirectional different speed ratio rotating power output for driving the power generator(109), wherein the power generator(109) and the loading wheel train(103) are integrally combined, or the power generator(109) is directly constituted by the loading wheel train(103) to be part of the power generator structure, wherein the transmission device (104) is constituted by one or more than one transmission devices of the following: 1) various gear-type, belt-type, friction-type fixed speed ratio or variable-speed ratio rotating type transmission functioning structure, or 2) a stepped or stepless variable speed device being operated manually, or by the mechanical force, or fluid force, or centrifugal force, or rotating torque or counter-rotating torque, or 3) the transmission device of the capability to operatively control the switching relationship of the relative rotating directions at the input end and output end, or 4) the clutch device or the single way clutch being operated manually, or by the mechanical force, or electromagnetic force, or fluid force, or centrifugal force, or rotating torque, or counter-rotating torque for connecting transmission or interrupting transmission clutch functioning device;

wherein the power generator(109) is further optionally installed with the power generator(109) related operative control device(110) and the circuit switch or protecting device(111).

Figure 12:
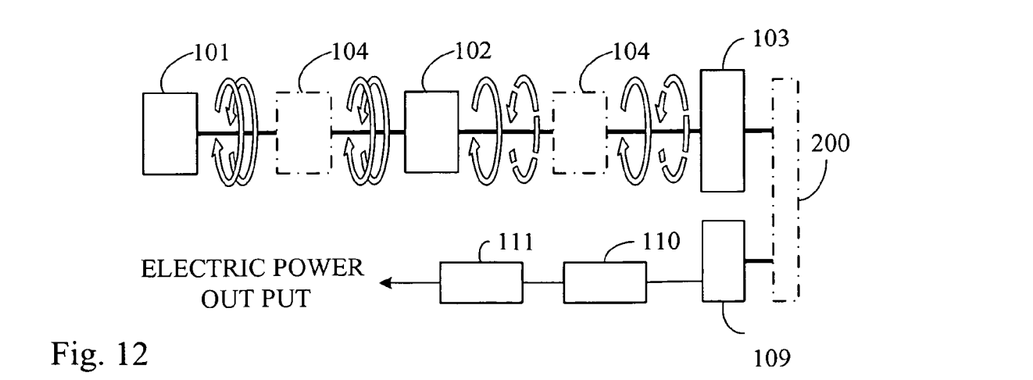
FIG. 12 is block schematic view of the application example showing that the loading wheel train(103) of the manpower driven carrier of the present invention is equipped with a power generator set(109).
Figure 13:
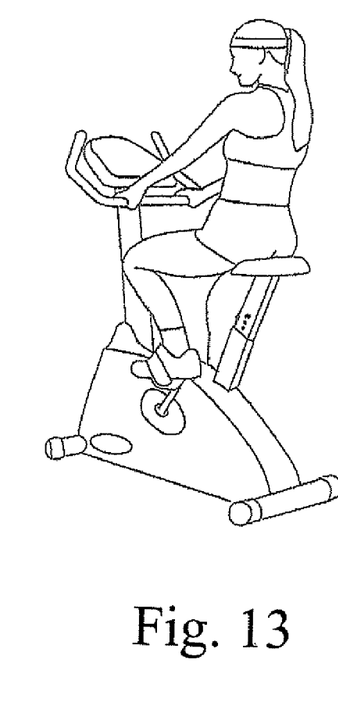
FIGS. 13-16 show various exercise bikes that may utilize the principles of the invention.
Figure 14:
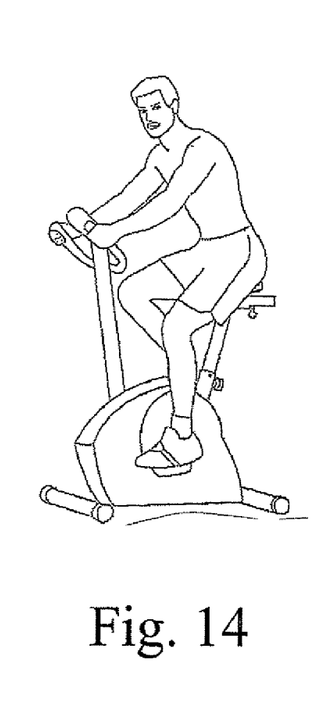
Figure 15:
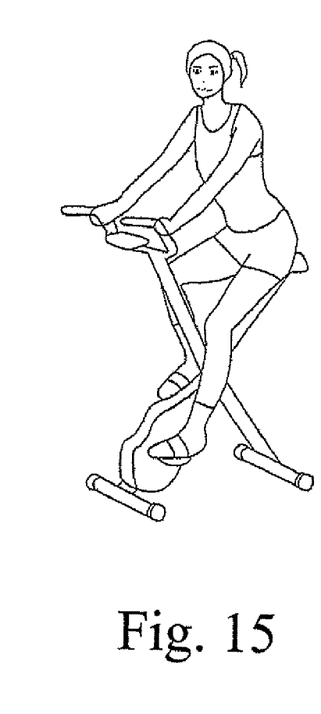
Figure 16:
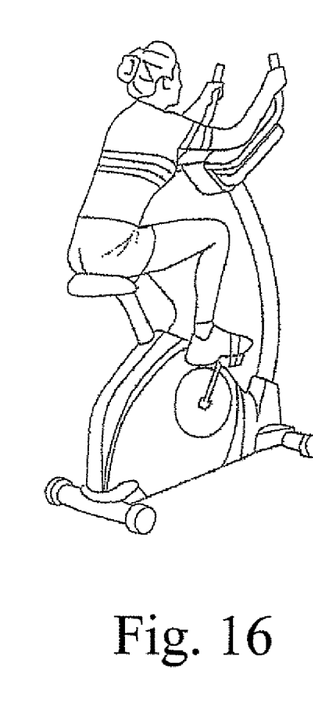

For the bidirectional different speed ratio driving device with bidirectional manpower input being used as the manpower carrier is optionally installed with the power generator (109) driven by the loading wheel train(103) directly or via the transmission device(200) as shown in FIG. 12 which is a block schematic view of the application example showing that the loading wheel train(103) of the manpower driven carrier of the present invention is matchingly installed with a power generator (109); wherein it comprises a bidirectional manpower input device(101) being driven by both or one of the hand and foot of manpower in positive or reverse rotation, and the output rotating power from the bidirectional manpower input device(101) is transmitted to the input end of the bidirectional different speed ratio speed change device(102) directly or via a transmission device(104), and it is further through the output end of the bidirectional different speed ratio speed change device(102) to provide bidirectional different speed ratio rotating power output for driving the power generator(109) via the loading wheel train(103), wherein the power generator is externally installed to be driven by the loading wheel train(103); the transmission device(104, 200) is constituted by one or more than one transmission devices of the following: 1) various gear-type, belt-type, friction-type fixed speed ratio or variable-speed ratio rotating type transmission functioning structure, or 2) a stepped or stepless variable speed device being operated manually, or by the mechanical force, or fluid force, or centrifugal force, or rotating torque or counter-rotating torque, or 3) the transmission device of the capability to operatively control the switching relationship of the relative rotating directions at the input end and output end, or 4) the clutch device or the single way clutch being operated manually, or by the mechanical force, or electromagnetic force, or fluid force, or centrifugal force, or rotating torque, or counter-rotating torque for connecting transmission or interrupting transmission clutch functioning device;

the power generator(109) is further optionally installed with the power generator related operative control device (110) and the circuit switch or protecting device(111).

The relevant operating function display device, or operator's physiological status detecting device, or display device is optionally installed according to driven loading characteristics on the said bidirectional manpower driven carrier, bidirectional manpower driven sports device, bidirectional manpower driven rotating type mechanical functioning device, or bidirectional manpower driven power generator of the bidirectional different speed ratio driving device with bidirectional manpower input.

In practical applications, the relevant devices of aforesaid bidirectional different speed ratio driving device with bidirectional manpower input are individually independently installed and further transmissionly connected, or two or more than two relevant devices of them are integrally combined.

FIGS. 13-16 show examples of exercise bikes that may utilize the bidirectional different speed ratio driving device of the invention. Advantages of providing such exercise bikes with a bidirectional different speed ratio driving device including the following:

Muscles in the whole body are used more completely. There are more than 639 skeletal muscles in a human body. About two thirds of those muscles are concentrated in the lower body. It is said that aging starts from the legs, so the best way to maintain vigor is leg muscle physical training. Since forward and reverse pedaling used different muscles, the bidirectional exercise bikes of FIGS. 13-16 can exercise more of those muscles by switching between forward and reverse pedaling.

The lower body can be sculpted more evenly. An exercise bike is good for shaping legs, and the more muscles that can be exercised, the more even shaping.

Stress injuries caused by using the same muscle and same joints for a long time can be reduced. There are many possibilities for exercise bikes to cause knee joint chronic injuries. The most common reason is improper cushion height, but the next most common reason is uneven leg strength. By working different muscles, bidirectional pedaling builds muscles more evenly and can therefore reduce sports injuries. Furthermore, with reverse pedaling, the bodies center of gravity and location of stresses is changed, which can reduce ischiopubic ramus stress, and perineum numbness and pain.

Figure 17:
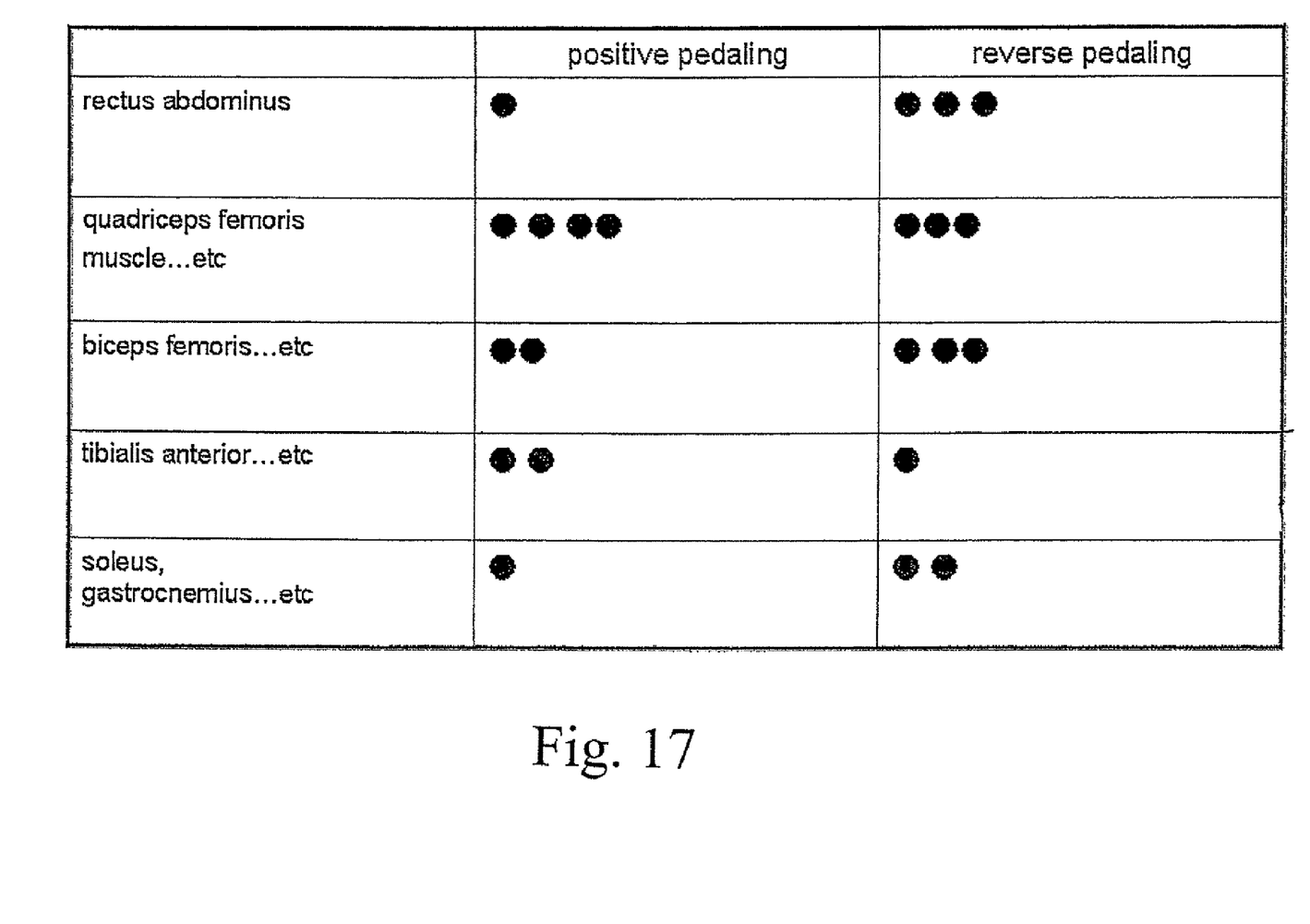
FIGS. 17 and 18 are charts respectively illustrating the benefits of bidirectional pedaling with respect to specific muscle groups, and the effects of reverse pedaling on hip stressors.

There are three major muscle groups used for riding an exercise bike: 1. the hip muscle group; 2. the thigh muscle group; and the shank or calf muscle group. During forward pedaling, the supporting points are the metatarsals of the feet, and the major contraction muscles affected are the quadriceps femoris muscles of the thigh (rectus femoris, vastus lateralis, vastus medialix, vatus intermedius, etc.) and the tibialis anterior muscles of the shank. On the other hand, during reversed pedaling, the supporting point is the heel and the major contraction muscles affected are the rectus abdominus muscle of the hip, biceps femoris, semitendinosus, and semimembranosus muscles of the thigh, and the soleaus gastrocnemius muscle of the shank. The relative effects on these muscles is summarized in FIG. 17, in which one dot indicates a relative small effect and four dots indicates a maximal effect on the listed muscle.

Figure 18:
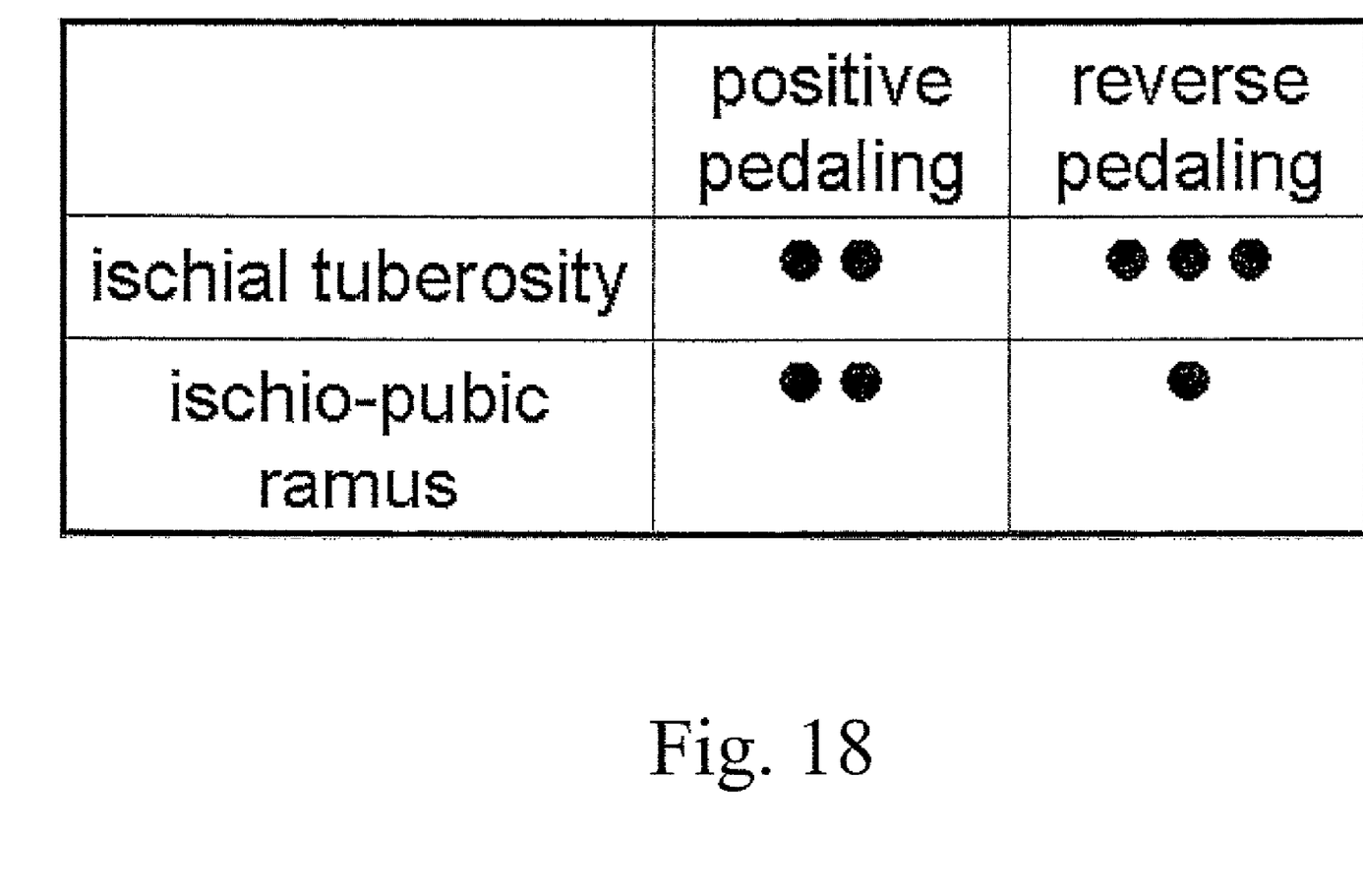

On the other hand, FIG. 18 illustrates the effect of forward and reverse pedaling on hip stressors. In a sitting posture, the major body weight is supported by two ischial tuberosities under the pelvis. Because of the cushion design of exercise bikes, not only are ischial tuberosities stressed, but also ischio-pubic ramus depending on the particular riding posture. Stress on ischial tuberosities is not a problem, but stress on the ischio-pubic ramus will cause less blood flow and cause various discomforts such as perineum numbness and pair over a long period of time, and thus it is desirable to reduce ischio-pubic ramus stress. However, in a riding posture where the angle between the rider's body and a horizontal line is 60 to 90 degrees, the center of body gravity moves backward while reverse pedaling, and thus part of the body weight shifts to ischial tuberosities, which together with bent-knees leg raise, can reduce ischio-pubic ramus stress.

Finally, as noted above, in addition to reducing ischio-public ramus stress, bidirectional pedaling can:

reduce muscle fatigue resulting from pedaling for a long time in the same posture and with the same movement;

reduce risk of tendonitis, which can lead to metatarsal pain, Achilles tendonitis, or plantar fasciitis and is caused by pedaling for a long time with an incorrect stepping point; and reduce knee and ankle injuries such as medial ligament strain injury, muscle strain injury, or tendon inflammation, all of which result from differences in muscle strength which can be relieved by pedaling in different directions to work the muscles more evenly.

The invention claimed is:

1. A bi-directional different-speed-ratio driving device with bi-directional manpower input, comprising:
 a bi-directional manpower-driven input device (101) arranged to be driven in both a first direction and a second direction opposite to the first direction, said input device (101) having a bi-directional output;
 a bi-directional different-speed-ratio speed change device (102) having a bi-directional power input directly or indirectly connected to the output of the manpower input device (101), said speed change device (102) having a speed change device output, wherein a speed change ratio of the speed change device (102) depends on a rotating direction of the bi-directional power input from the manpower input device (101) so that changing a rotating direction of the output of the manpower input device (101) changes a rotating speed of the speed change device output;
 a load (103, 105, 106, 107, 108, 109, or 112) directly or indirectly driven by the speed change device output,
 whereby rotation of the input device (101) in different directions exercises a variety of different muscles to reduce injuries and improve muscle strength and density of the different muscles.

2. A bi-directional different-speed-ratio driving device with bi-directional manpower input as claimed in claim 1, wherein said bi-directional manpower-driven input device (101) is a pedal or handle of an exercise device.

3. A bi-directional different-speed-ratio driving device with bi-directional manpower input as claimed in claim 2, wherein said exercise device is an exercise bicycle.

4. A bi-directional different-speed-ratio driving device with bi-directional input as claimed in claim 1, further comprising a transmission device (104) connected between the input device (101) and the speed change device (102) for changing a speed ratio between the output of the input device (101) and the input of the speed change device (102).

5. A bi-directional different-speed-ratio driving device with bi-directional input, as claimed in claim 1, further comprising a transmission device (104) connected between the speed change device (102) and the load (103, 105, 106, 107, 108, 109, or 112) for changing a speed ratio between the speed change device (102) and the load (103, 105, 106, 107, 108, 109, or 112).

6. A bi-directional different-speed-ratio driving device with bi-directional input as claimed in claim 5, further comprising a transmission device (104) connected between the input device (101) and the speed change device (102) for changing a speed ratio between the output of the input device (101) and the input of the speed change device (102).

7. A bi-directional different-speed-ratio driving device with bi-directional manpower input as claimed in claim 1, wherein said load is a loading wheel train (103).

8. A bi-directional different-speed-ratio driving device with bi-directional manpower input as claimed in claim 1, wherein said load includes a damped load (105, 106, 107, 112) that causes resistance to rotation of the manual input (101) by one of friction damping, fluid damping, counter-rotating torque damping by power generation, electromagnetic eddy current generation damping, electric counter-rotating torque damping, and damping by an interrupting transmission clutch, in order to increase exertion by an exerciser.

9. A bi-directional different-speed-ratio driving device with bi-directional manpower input as claimed in claim 8, wherein said damped load is an operatively controllable damped load (105 or 107).

10. A bi-directional different-speed-ratio driving device with bi-directional manpower input as claimed in claim 8, wherein said damped load (112) is a damping device installed on a loading wheel train (103).

11. A bi-directional different-speed-ratio driving device with bi-directional manpower input as claimed in claim 1, wherein said load is a rotating mechanical device (108), said mechanical device being one of a fluid pump, fan, and inertial energy storing flywheel.

12. A bi-directional different-speed-ratio driving device with bi-directional manpower input as claimed in claim 1, wherein said load is an electrical generator (109).

13. A bi-directional different-speed-ratio driving device with bi-directional manpower input as claimed in claim 12, wherein said electrical generator (109) is electrically connected to an operative control device (110) and protective device (111).

14. A bi-directional different-speed-ratio driving device with bi-directional manpower input as claimed in claim 12, wherein said electrical generator (109) is driven by a loading wheel train (103) directly or indirectly connected to an output of the speed change device (102).

\* \* \* \* \*